US007322124B2

(12) United States Patent
Bouman

(10) Patent No.: US 7,322,124 B2

(45) Date of Patent: Jan. 29, 2008

(54) SPRAY-DRYING DEVICE

(76) Inventor: Antonius Johannes Maria Bouman, 16, Slinge, 9204 KL Drachten (NL)

(*) Notice: Subject to any disclaimer, the term of this patent is extended or adjusted under 35 U.S.C. 154(b) by 0 days.

(21) Appl. No.: 10/539,124

(22) PCT Filed: Dec. 5, 2003

(86) PCT No.: PCT/NL03/00865

§ 371 (c)(1),
(2), (4) Date: Jan. 17, 2006

(87) PCT Pub. No.: WO2004/054682

PCT Pub. Date: Jul. 1, 2004

(65) Prior Publication Data

US 2006/0143939 A1 Jul. 6, 2006

(30) Foreign Application Priority Data

Dec. 17, 2002 (NL) .................................. 1022186

(51) Int. Cl.
*F26B 19/00* (2006.01)

(52) U.S. Cl. .............................. 34/90; 34/138; 34/167

(58) Field of Classification Search .................... 34/90, 34/92, 138, 167; 435/283.1
See application file for complete search history.

(56) References Cited

U.S. PATENT DOCUMENTS 3,228,838 A * 1/1966 Rinfret et al. ................ 34/284
4,657,767 A * 4/1987 Meade ....................... 426/471
4,883,507 A * 11/1989 Rey et al. ..................... 95/273

FOREIGN PATENT DOCUMENTS

| | | |
|---|---|---|
| CA | 2374220 | 12/2000 |
| DE | 368877 | 2/1923 |
| DE | 19927537 | 12/2000 |
| GB | 221598 | 9/1924 |
| WO | WO 01/33971 A1 | 11/1999 |

* cited by examiner

*Primary Examiner*—S. Gravini

(74) *Attorney, Agent, or Firm*—Browdy and Neimark, PLLC

(57) ABSTRACT

The invention relates to a spray-drying device (1) having a vertical drying chamber (2), material-atomization means (4) and drying-gas feed (6) means. Filter elements (11) are present in order to filter the fine particles out of the flow of drying gas (7). The fine particles are periodically removed from the filter elements (11) and collected in fine-particle collection means (10) in such a manner that they remain separate from the main flow of spray-dried material. In this way, it is possible to successfully control the properties of the spray-dried (main) material without it being undesirably influenced by the fine particles.

14 Claims, 4 Drawing Sheets

SPRAY-DRYING DEVICE

BACKGROUND OF THE INVENTION

1. Technical Field of the Invention

The present invention relates to a spray-drying device, comprising a vertical drying chamber which comprises: a material feed for supplying material which is to be spray-dried, an atomization means for atomizing the material which is to be spray-dried, a drying-gas feed for supplying drying gas, a drying-gas discharge for discharging drying gas, a material discharge for discharging spray-dried material, filter means for separating entrained fine particles out of discharged drying gas, and fine-particle removal means for removing fine particles which have been deposited on the filter means from the filter means.

2. Prior Art

WO 97/14288 has disclosed a spray-drying appliance having a vertically arranged drying chamber with an atomization device and means for introducing a flow of drying gas. Furthermore, a number of filter elements with substantially inflexible filter walls are arranged in the top part of the chamber, for retaining particles which are entrained with the drying gas. The filter elements are in communication with a compressed-gas feed which at intervals applies pulsed pressure to the filter elements so as to remove the particles which have been retained.

One drawback of this known device is that the particles which have been detached from the filter elements (also known as fines or fine particles) might become mixed with the unentrained, heavier spray-dried particles (also known as heavies) in the drying chamber. This entails the risk of a mixture of particles with different properties, including particle size distribution and moisture content, being formed.

OBJECT AND SUMMARY OF THE INVENTION

It is an object of the present invention to provide improved control of the properties of the spray-dried material which is ultimately obtained.

The present invention achieves this object by means of a spray-drying device of the type described in the introduction which is characterized in that the spray-drying device also comprises fine-particle collection means for collecting the fine particles which have been removed from the filter means by the fine-particle removal means, the collected fine particles and the spray-dried material being separate products.

The spray-drying device according to the invention has fine-particle collection means for collecting the fine particles which have been removed, in such a manner that they cannot be mixed with the spray-dried main material, in other words they then form separate products. These separate products, namely the fine particles and the spray-dried main material, can then if desired be discharged separately, can be treated further independently of one another, can be mixed again in specific ratios, etc.

In the context of the present invention, the term vertical drying chamber is to be understood as meaning a drying chamber in which the spray-drying process of atomization, drying and collection of material takes place substantially vertically. In this way, it is possible to make efficient use of the force of gravity to collect spray-dried material and fine particles, which in the case of horizontal drying chambers requires additional collection and/or conveyor means.

The fine-particle collection means may be designed in various ways. By way of example, these means comprise collection funnels or the like which can collect the fine particles when the fine-particle removal means remove the fine particles from the filter means. At that time, the flow of drying gas is preferably shut down, so that it is not still possible for mixing of fine particles and spray-dried main material to occur. It is also possible for the fine-particle collection means to be of movable design, in such a manner that they are only moved into an active position at the filter means when their action is desired. This means that the fine-particle collection means will have little or no adverse effect on the spray-drying process.

Preferably, however, the fine-particle collection means comprise at least one separate compartment of the drying chamber, the filter means and the fine-particle removal means being arranged in the at least one compartment, and the drying-gas discharge being in open communication with the drying chamber via the at least one compartment. In this context, a separate compartment is understood as meaning a space which entrained fine particles can enter but cannot, or at least substantially cannot, leave again. A compartment may, for example, be formed by fitting one or more suitable partitions. Obviously, the drying gas has to be discharged via the said separate compartment. Designing the fine-particle collection means in this way ensures reliable separation of fine particles and spray-dried main material while the separate compartment moreover offers the option of installing additional equipment for treating the fine particles which have been collected.

Preferably, at least one compartment is in direct communication with the drying chamber by means of at least one opening in a wall thereof. This ensures that the flow of drying gas is subject to the minimum possible resistance. Although it is in principle possible for the communication between the compartment and the remainder of the drying chamber to be created by means of a pipeline, this presents the risk of fine particles settling on its wall, resulting in contamination, the risk of blockages, etc. If, in accordance with the preferred embodiment, communication is now created by means of an opening in a wall in the drying chamber, this risk is eliminated. Obviously, it is possible to create a plurality of openings, in such a manner that efficient separation of the compartment and the drying chamber continues to be ensured.

A preferred embodiment is characterized in that the at least one compartment is in communication with the drying chamber by means of a group of at least two openings in a wall thereof, which openings are distributed evenly over a periphery of the drying chamber. In this embodiment, the openings distributed evenly over the periphery of the drying chamber make it possible to ensure that the fine particles are collected very efficiently. It is possible to make favourable use of symmetry of the spray-drying device. Although the spray-drying device according to the invention does not in principle have to be symmetrical in structure, it will often have a symmetry of rotation, or sometimes will even be square in cross section. One expedient form of the spray-drying device according to the invention is one which has a cylindrical top side which merges into a cone at the bottom. In this case, a discharge for spray-dried main material may then be arranged at the tip of the cone.

In an expedient embodiment, the at least one compartment is in communication with the drying chamber by means of at least two groups of openings arranged at different heights in the drying chamber. With this embodiment, it is possible to make an even finer distinction with regard to the particle size distribution of the fine particles which are collected. The lightest particles will be entrained more easily by the drying gas, i.e. will also find it easier to reach higher sections of the drying chamber. In this way, it is possible to create a finer particle size distribution of the fine particles.

At this point, it should be noted that the number of compartments is not subject to any particular limitation. In principle, one large compartment, at which all the openings meet with the drying chamber, is sufficient. However, a plurality of compartments, each with one or more openings leading to the drying chamber, are also possible. It is preferable for the one or more compartments to be arranged around the drying chamber. This means that the drying chamber does not require any additional insulation or at least requires less additional insulation. The drying chamber as it were shares the outer wall with the wall of the one or more compartments. This not only results in a space-saving and material-saving, compact structure, but also saves energy, on account of improved insulation and lower flow resistance to the drying gases, and reduces contamination. Cleaning costs will also be lower as a result.

The filter elements may be selected from systems which are known in the prior art. However, the filter means advantageously comprise a bag filter or filter hose. With the aid of filter elements of this type, it is possible to successfully comply with strict dust emission requirements. Moreover, such filter means can be cleaned successfully and easily. Other filter elements used, such as cyclones, often require downstream wet scrubbers in order to comply with emission requirements, which entails a wet stream of waste.

The filter means of a spray-drying installation according to the invention can operate with a relatively high air load, typically 2 to 4 $m^2$/min, and with a relatively low pressure drop, typically 500 to 1000 Pa. In this way, it is possible to ensure a high level of production at relatively low cost.

The one or more compartments and filter elements are designed in such a manner that they can be cleaned using, for example, liquid detergent. This advantageously takes place at the same time as the wet cleaning of the drying chamber. This allows the entire spray-drying installation to be cleaned quickly and efficiently.

The fine-particle removal means preferably comprise means for reversing the flow of drying gas. These means for reversing the flow of drying gas comprise means for reversing the direction of flow of the drying gas through the filter elements so that the fine particles are removed from the filter elements. This is preferably achieved by creating gas pulses at intervals. Suitable gas-pulsating means may be present for this purpose. The removal of fine particles by means of gas pulses has the advantage that even fine particles which have penetrated slightly deeper can easily be removed from the filter elements. Nevertheless, however, it is also possible to use other fine-particle removal means, such as vibratory means for vibrating the filter elements.

The fine-particle collection means of the spray-drying device according to the invention advantageously also comprise fine-particle treatment means. These fine-particle treatment means are intended to treat the collected fine particles further in accordance with requirements imposed thereon. In this context, consideration may be given, for example, to wetting means for the fine particles, since the fine particles which are collected will generally be drier than the spray-dried main material, since their surface area/volume ratio is lower.

The fine-particle collection means advantageously comprise fine-particle conveyor means. With the aid of the fine-particle conveyor means, they can be conveyed to a discharge point for the fine particles. In this way, it is possible to collect the fine particles from numerous separate filter elements and to convey them to just one or a few discharge points. The fine-particle conveyor means preferably comprise a perforated plate through which gas can be blown. This plate forms a suitable conveyor means for the fine particles, allowing advantageous use to be made of existing gas streams.

In another preferred embodiment, the fine-particle conveyor means comprise a discharge opening leading to the drying chamber. The optionally treated fine particles can then in turn be fed to the drying chamber at a desired location in order to form part of the spray-drying process, to be collected, etc. The fine particles can, for example, be used in the agglomeration of spray-dried material. The said discharge opening for the fine particles will preferably be located on the underside of a compartment. Obviously, it is also possible for the discharge opening to be located at the end of the fine-particle conveyor means, at a distance from the one or more compartments.

The spray-drying device according to the invention comprises atomization means for atomizing the material which is to be spray-dried, these means being designed, for example, as pressure nozzles, two-fluid nozzles or rotating disc atomizers. These embodiments are well known in the prior art.

The spray-dried main material comprises the heavier particles which are not entrained by the flow of drying gas. These heavier particles, also known as heavies, drop downwards and leave the drying chamber at the underside, where they are treated further in the usual way, for example by means of a fluidized bed, ISB or PT, optionally followed by further drying and cooling. It is possible for at least a proportion of the gas which is used in fluidized beds and the like also to be used as a drying gas in the drying chamber. This creates an upwardly directed flow of drying gas which, optionally together with at least a proportion of the flow of drying gas supplied elsewhere, can entrain the lighter particles or fines.

The spray-drying installation according to the invention is suitable for the production of numerous different products in various different fields, including, for example, foodstuffs, pharmacy and chemistry. Products which may be mentioned include, inter alia, whole milk powder, skimmed milk powder, powder for baby food, whey powder, whey permeate, maltodextrin, caseinates, starch, etc. These products may be agglomerated or unagglomerated. The properties of these products can be excellently controlled with the aid of the spray-drying device according to the invention. In particular, products in the present device are produced with properties, such as dissolution behaviour, filling volume, etc., which are at least equal to those produced using existing devices. Furthermore, the device can be quickly and easily set up to produce different products, since it can be cleaned quickly and efficiently.

Furthermore, the device according to the invention is highly compact and requires significantly less space than a standard device with an external filter casing.

BRIEF DESCRIPTION OF THE DRAWINGS

The invention will be explained below with reference to the appended drawing, in which.

DETAILED DESCRIPTION OF THE PREFERRED EMBODIMENT(S) OF THE INVENTION

Figure 1:
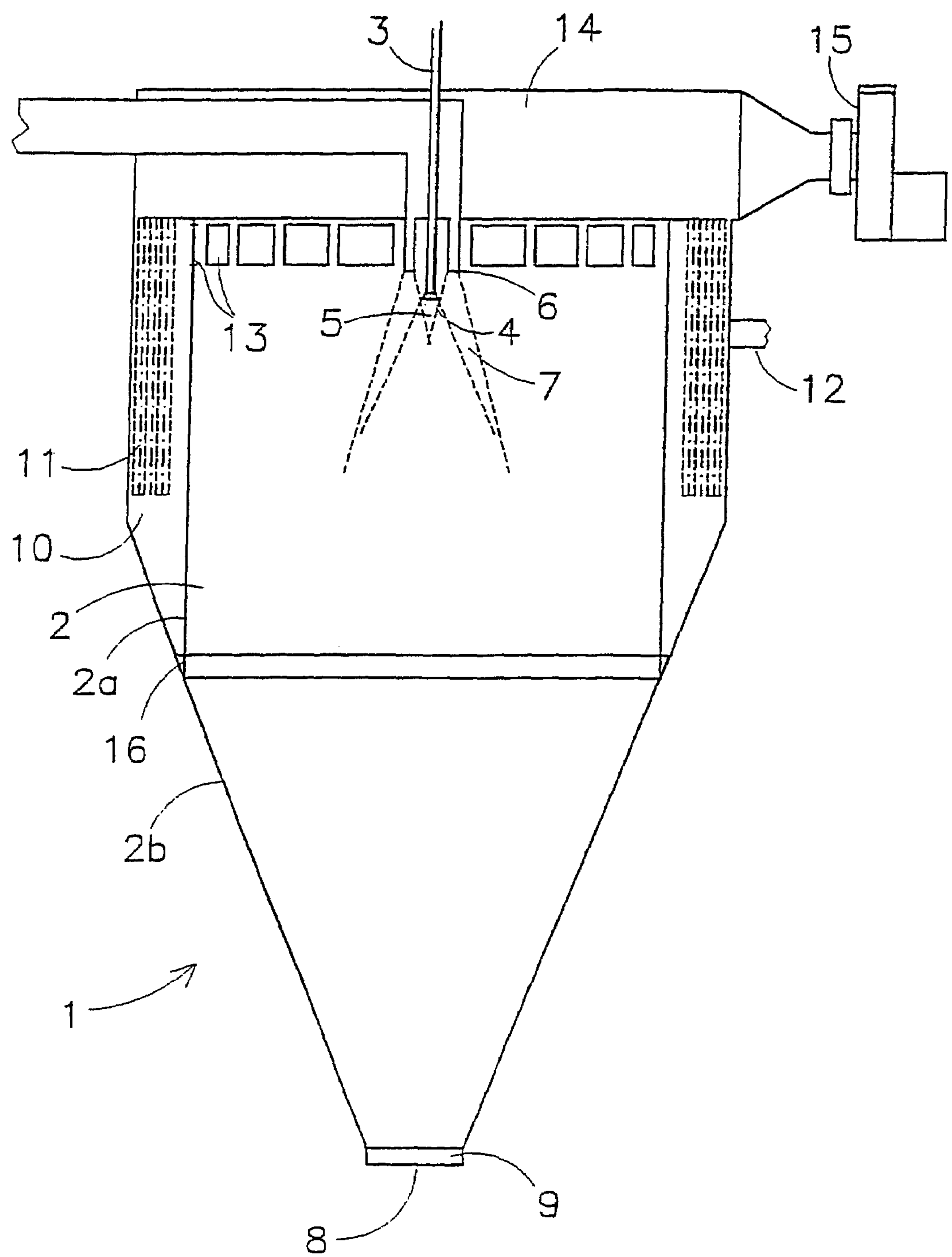
FIG. 1 shows a cross section through a spray-drying installation in accordance with the invention.

In FIG. 1, 1 overall denotes a spray-drying installation. 2 denotes a drying chamber having a top wall 2*a* around a top section and a bottom wall 2*b* around a bottom section. 3 denotes a diagrammatically indicated material feed having an atomization opening 4 which forms spray cone 5. 6 is a drying-gas feed, originating from main feed 6*a*, which creates drying-gas streams 7.

8 denotes a material discharge and 9 denotes a diagrammatically indicated fluidized bed.

A filter chamber is denoted by 10 and comprises filter hoses 11 with, connected to them, a pulsed-gas inlet 12 and drying-gas discharge holes 13 which are in communication with gas plenum 14 and pump 15. 16 denotes a fine-particle fluidized bed which will be explained below.

Material which is to be spray-dried, for example a whey concentrate, a lactose solution, etc., is fed into the spray-drying device via material feed 3 and is atomized via atomization opening 4. For this purpose, atomization means (not shown separately) are present, in the form of, for example, an atomization disc or pressure nozzle. A spray cone 5 is formed by fine droplets of the material which is to be spray-dried. The spray cone 5 intersects drying-gas streams 7 which are supplied via drying-gas feed 6. The drying gas supplied may, for example, be air at a desired temperature, optionally having been additionally dried or humidified or provided with other substances. It is also possible to supply an inert or other gas or alternatively steam or the like.

In the drying chamber 2, the droplets of the spray cone of the material to be spray-dried will dry and form small grains. The spray-dried (main) material formed in this way will drop downwards and can be discharged via material discharge 8.

A storage unit or a conveyor means (not shown) may be arranged beneath material discharge 8. The figure diagrammatically indicates a fluidized bed 9 for further treatment of the spray-dried main material. If desired, it is also possible for other further-treatment devices to be fitted instead of a fluidized bed 9.

The drying chamber is a "vertical" drying chamber, in the sense that the spray-drying process takes place substantially from the top downwards and the spray-dried main material is removed at the underside. For this purpose, the drying chamber 2 comprises a top part having a cylindrical top wall 2*a* and a bottom part having a substantially conical bottom wall 2*b*. The shape of the bottom part which ends at a point allows simple collection and discharge of the spray-dried main material.

The filter chamber 10 forms part of the fine-particle collection means, in particular the compartment according to the invention. The drying gas is discharged from the drying chamber 2 via drying-gas discharge holes 13. The used drying gas enters the filter hoses 11 via the drying-gas discharge holes 13. The filter hoses 11 comprise frameworks with porous material thereon, which allows gas to pass through but retains fine particles on its outer wall. The drying gas which enters the filter hoses is discharged via the gas plenum 14 arranged above it and is sucked out with the aid of the pump 15.

In the spray cone 5, the smallest drops will dry to form what are known as fines or fine particles, which are so light that they are entrained by the drying-gas stream and do not reach the spray-dried main material. The fine particles form a possible source of contamination, not only to the spray-drying installation itself but also to the environment. They therefore have to be collected. In addition, the fine particles may form a reusable material. By way of example, fine particles can be used for the agglomeration of the material which is to be spray-dried. This too is a reason to collect the fine particles and where possible process them further.

As described above, the fine particles are collected on the walls of the filter hoses. At this point, it should be noted that filter hoses merely represent one example of the possible filter elements. Any filter mechanism which is known from the prior art can be used. The more fine particles are deposited on the walls of the filter hoses 11, the more likely the latter are to become blocked. Therefore, the fine particles have to be removed from the filter hoses at suitable intervals. In the spray-drying device shown in FIG. 1, this is achieved with the aid of gas streams which flow in an opposite direction to the drying-gas streams. For this purposes, there is a separate pulsed-gas inlet 12, via which suitable means (not shown) supply a gas pulse to the filter hoses at set times. The gas pulse as it were blows the fine particles out of the filter hoses. It is also possible to use other fines removal means, such as filter shakers and the like.

The fine particles which have been removed will then sink to the bottom of the filter chamber 10, where they can be treated or processed further. This will be explained in more detail below.

Figure 2:
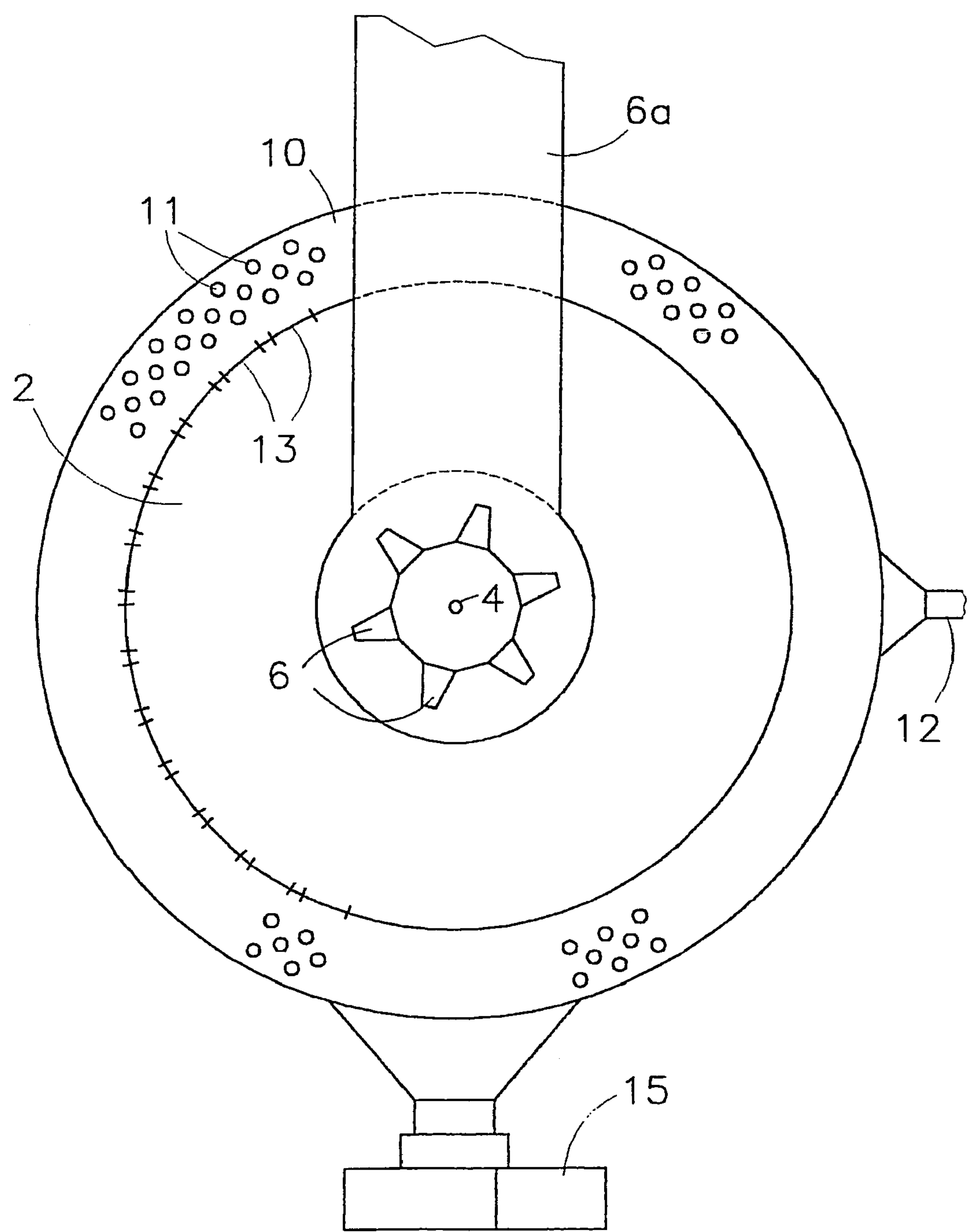
FIG. 2 shows a plan view of the spray-drying installation illustrated in FIG. 1.

FIG. 2 shows a plan view of the spray-drying installation shown in FIG. 1. Identical reference numerals denote identical components. 6*a* is a main drying-gas feed, which is in communication with the drying-gas feeds 6. A large number of filter hoses 11 is arranged in filter chamber 10. Only some of these filter hoses are illustrated.

It is clearly apparent that filter chamber 10 is arranged around a large proportion of the drying chamber 2. The result of this is that the drying chamber 2 is virtually completely insulated with respect to the environment. This not only saves energy but also creates more stable conditions inside the drying chamber 2. Obviously, this is not imperative, and in some cases it may be appropriate for only a small proportion of the wall of the drying chamber 2 to be shielded by the filter chamber 10, for example if the spray-drying device is cooled, rather, or if a large proportion of the drying chamber is used as access.

Figure 3:
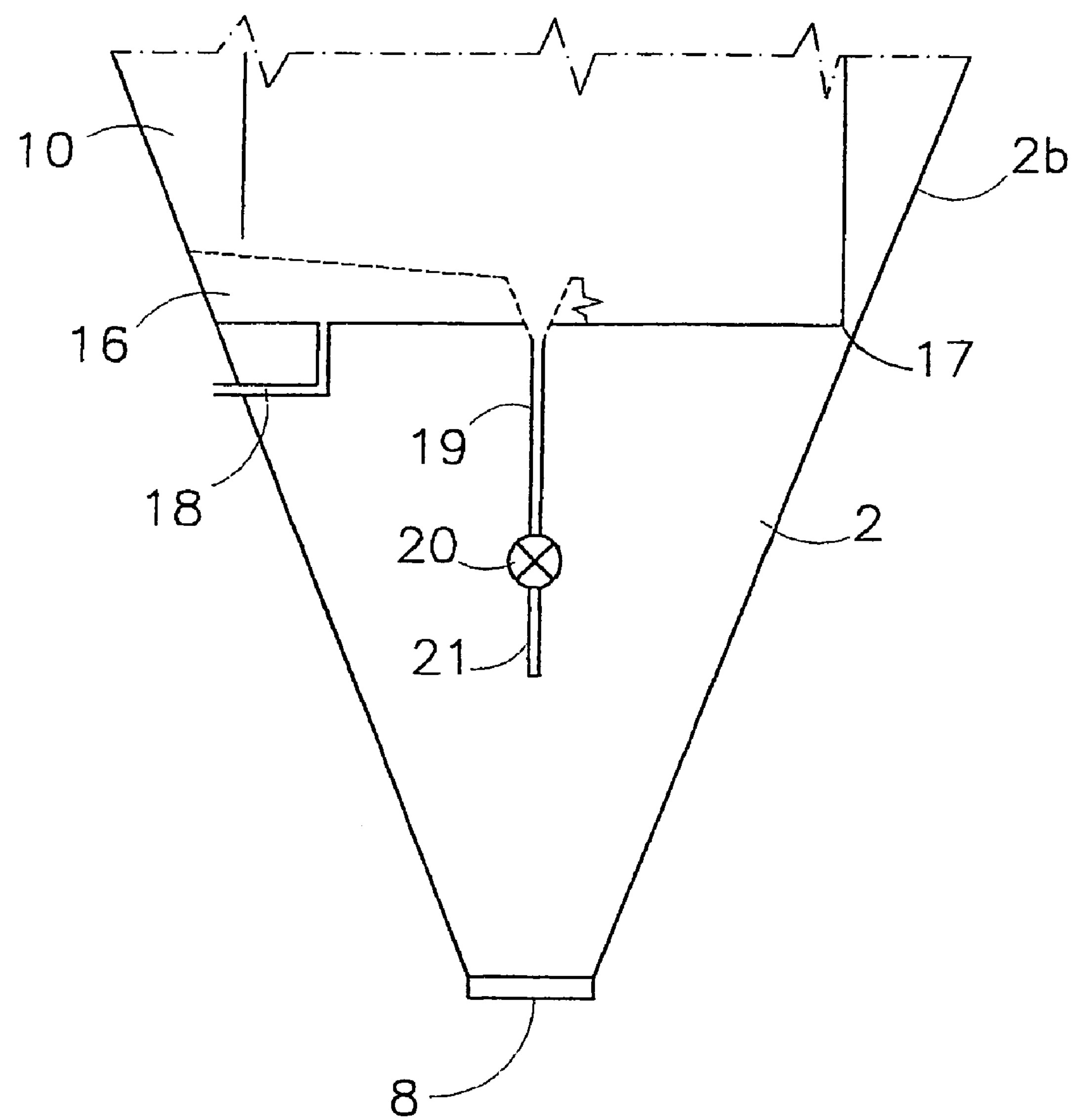
FIG. 3 shows a side view in diagrammatic cross section through the bottom part of a spray-drying installation in accordance with the invention.

FIG. 3 shows a side view, in cross section, of the bottom part of the spray-drying installation 1 shown in FIG. 1, with two different fine-particle treatment devices.

In the left-hand section, 16 forms a fine-particle fluidized bed, and 18 represents a fluidized-bed gas feed. A fine-particle discharge pipe 19 carries the collected fine particles to fine-particle lock 20, which can empty them to, for example, material discharge 8 via fine-particle discharge 21.

A fine-particle fluidized bed 16, which if desired can condition the fine particles which drop onto it and/or move them towards a fine-particle discharge, is arranged at the bottom of the drying chamber 10. The fine-particle fluidized bed 16 can be provided with air via fluidized-bed gas feed 18.

The fine-particle fluidized bed 16 may, for example, be designed as a perforated plate through which air is blown. Obviously, it is also possible for another fluid, such as steam or an inert gas, to be supplied. Suitable design of the gas-outlet openings of the fine-particle fluidized bed 16 allows the bed simultaneously to serve as a fine-particle conveyor means. The fine particles, which have optionally been conditioned further, then pass slowly to fine-particle discharge pipe 19. The fine particles drop through this pipe 19 to a fine-particle lock 20. The latter may comprise a reservoir (not shown) with an actuatable valve, or alternatively also other means (likewise not shown) which can be used to treat the fine particles further. In this context, consideration may be given to the addition of further substances, such as aromatic substances, or means for agglomerating fine particles to form larger particles.

After any additional treatment, the fine particles can be discharged further via fine-particle discharge 21. By way of example, they may be discharged to the drying chamber 2, where, via the material discharge 8, they reach the spray-dried main material. It is also possible to design a separate fine-particle discharge which opens out onto a silo or the like.

In the right-hand section of FIG. 3, a fine-particle discharge slot 17 is shown at the underside of filter chamber 10. If desired, the fine particles which have been removed and collected can be fed directly, via this slot, to the drying chamber 2. This is the case, for example, if the fine particles have already been sufficiently agglomerated on the filter hoses or if they have dried there to a sufficient degree to be reintroduced into the drying chamber. The fine-particle discharge slot 17 may be of very narrow design, for example between 5 and 30 mm, in order in this way to ensure that the minimum possible amount of fine particles are incorrectly supplied to the underside of the filter chamber 10. The location of the fine-particle discharge slot 17 can be selected as desired.

Figure 4:
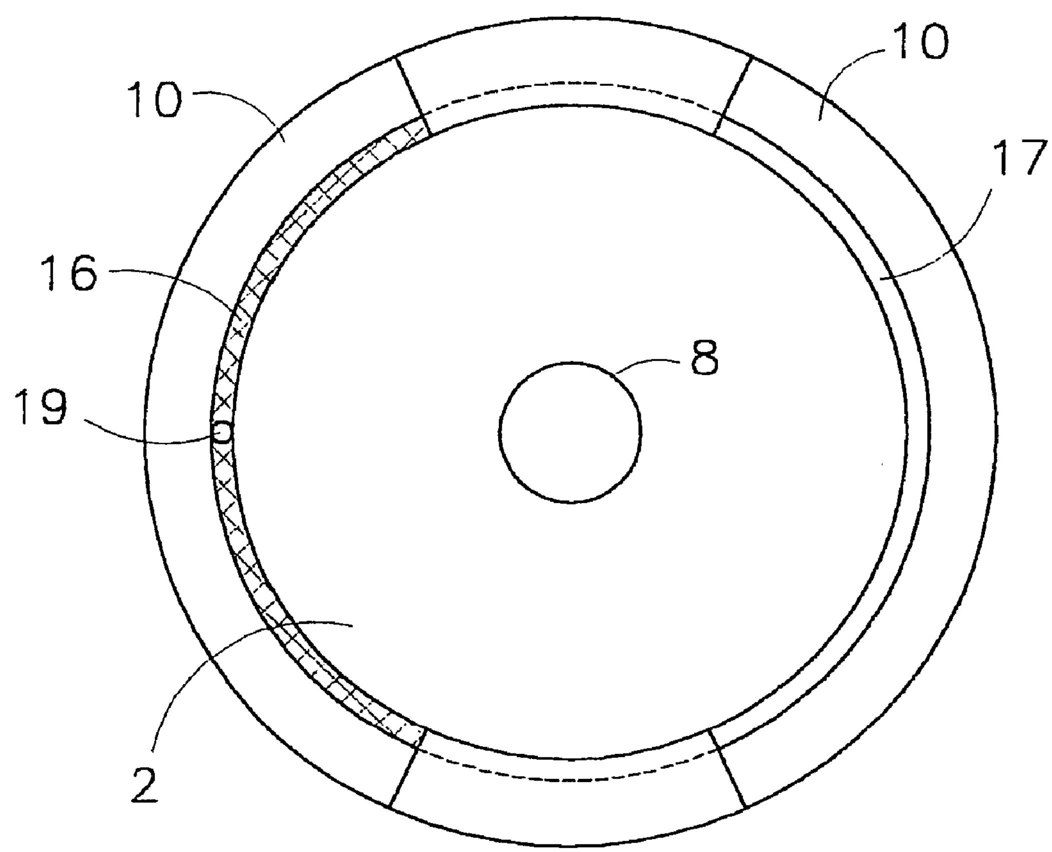
FIG. 4 shows a plan view of a bottom part of the spray-drying installation shown in FIG. 3.

FIG. 4 shows a plan view of the cross section through the bottom part of the spray-drying device shown in FIG. 3.

In the left-hand section, 16 denotes the fine-particle fluidized bed and 19 denotes the fine-particle discharge pipe. In the right-hand section, 17 denotes the fine-particle discharge slot.

The fine-particle fluidized bed 16 may, for example, comprise a perforated plate through which air is blown in order in this way to keep the fine particles fluidized. If the perforations are of suitable design, for example directed towards a discharge point, the fine-particle fluidized bed 16 can also serve as a conveyor means for the fine particles. Although only one fine-particle discharge pipe 19 is shown, there may of course also be more of these, for example if large quantities of fine particles are collected.

The right-hand section of the figure shows the fine-particle discharge slot 17. This in this case comprises the entire underside of the associated filter chamber 10. It is also possible to use a largely closed base for this filter chamber, sloping towards at least one discharge slot which is smaller than the complete underside of the filter chamber. In this way, the fine particles are released onto just one of a small number of well-defined positions.

The invention claimed is:

1. Spray-drying device (1), comprising a vertical drying chamber (2) which comprises:

a tubular material feed (3) which supplies material which is spray-dried, an atomization means (4) on the free end of the tubular material feed which atomizes the material which is to be spray-dried, a tubular drying-gas feed (6) which supplies drying gas, wherein an outlet end of the tubular material feed (3) is partially coaxially located within an outlet end of the tubular drying-gas feed (6) at a point where both the outlet end of the tubular material feed and the tubular drying-gas feed are coaxially located on the longitudinal axis at a top of the drying chamber;

wherein an outlet opening of the atomization means is provided below an outlet opening of the tubular drying-gas feed to facilitate the atomization of the material;

a drying-gas discharge (8) at a bottom end of the drying chamber that discharges drying gas, a material discharge (9) at the bottom end of the drying chamber that discharges spray-dried material, filter means (11) enclosed around a periphery of the drying chamber that separate only entrained fine particles out of discharged drying gas, fine-particle removal means (12) that removes fine particles which have been deposited on the filter means (11), and a fine-particle collection means (10) for collecting the fine particles which have been removed from the filter means (11) by the fine-particle removal means (12), the collected fine particles and the spray-dried material being separate products which are separately discharged.

2. Spray-drying device according to claim 1, wherein the fine-particle collection means comprises at least one separate compartment of the drying chamber, the filter means and the fine-particle removal means being arranged in the at least one compartment, and the drying-gas discharge being in open communication with the drying chamber via the at least one compartment.

3. Spray-drying device according to claim 2, wherein the at least one compartment is in direct communication with the drying chamber by at least one opening in a wall thereof.

4. Spray-drying device according to claim 3, wherein the at least one compartment is in communication with the drying chamber by means of a group of at least two openings in a wall thereof, which openings are distributed evenly over the periphery of the drying chamber.

5. Spray-drying device according to claim 4, wherein the at least one compartment is in communication with the drying chamber by means of at least two groups of openings arranged at different heights in the drying chamber.

6. Spray-drying device according to claim 1, wherein the filter means comprise one of a bag filter and a filter hose.

7. Spray-drying device according to claim 1, wherein the fine-particle removal means comprises means for reversing the flow of drying gas.

8. Spray-drying device according to claim 1, wherein the fine-particle collection means also comprises fine-particle treatment means.

9. Spray-drying device according to claim 1, wherein the fine-particle collection means also comprises fine-particle conveyor means.

10. Spray-drying device according to claim 9, wherein the fine-particle conveyor means comprise a perforated plate through which gas can be blown.

11. Spray-drying device according to claim 9, wherein the fine-particle conveyor means comprise a discharge opening leading to the drying chamber.

12. Spray-drying device according to claim 1, wherein the diameter of the outlet opening of the tubular drying-gas feed is larger than that of the atomization means.

13. Spray-drying device (1), comprising a vertically extending drying chamber (2) which comprises:

a material feed (3) for supplying material which is to be spray-dried, an atomization means (4) for atomizing material which is to be spray-dried, a drying-gas feed (6) for supplying drying gas, a drying-gas discharge (8) for discharging drying gas, a material discharge (9) for discharging spray-dried material, filter means (11) for separating only entrained fine particles out of discharged drying gas, and fine-particle removal means (12) for removing fine particles which have been deposited on the filter means (11) from the filter means (11), wherein the spray-drying device also comprises fine-particle collection compartment (10) for collecting the fine particles which have been removed from the filter means (11) by the fine-particle removal means (12), the collected fine particles and the spray-dried material being separate products which are separately discharged.

14. Spray-drying device (1), comprising a vertically extending drying chamber (2) which comprises:

a material feed (3) for supplying material which is to be spray-dried, an atomization means (4) for atomizing material which is to be spray-dried, a drying-gas feed (6) for supplying drying gas, a drying-gas discharge (8) for discharging drying gas, a material discharge (9) for discharging spray-dried material, filter means (11) for separating only entrained fine particles out of discharged drying gas, and fine-particle removal means (12) for removing fine particles which have been deposited on the filter means (11) from the filter means (11), wherein the spray-drying device also comprises a filter chamber (10) for collecting the fine particles which have been removed from the filter means (11) by the fine-particle removal means (12), the collected fine particles and the spray-dried material being separate products which are separately discharged.

* * * * *